United States Patent [19]

Reynolds

[11] 3,916,835

[45] Nov. 4, 1975

[54] POULTRY CONVEYING SYSTEM

[75] Inventor: Frank N. Reynolds, Auburn, Maine

[73] Assignee: Poultry Transaire Systems, Inc., St. Lewiston, Maine

[22] Filed: Nov. 7, 1973

[21] Appl. No.: 413,613

[52] U.S. Cl. .................................. 119/12; 119/82
[51] Int. Cl.² ................................ A01K 29/00
[58] Field of Search ................ 119/12, 82, 52 AF; 214/83.26, 83.36

[56] References Cited
UNITED STATES PATENTS

| | | | |
|---|---|---|---|
| 3,173,564 | 3/1965 | Mayo | 119/12 X |
| 3,602,198 | 8/1971 | Tackett | 119/82 |
| 3,754,528 | 8/1973 | Downing | 119/52 AF |

*Primary Examiner*—Hugh R. Chamblee
*Attorney, Agent, or Firm*—Eisenman, Allsopp and Strack

[57] ABSTRACT

A multi-tiered compartment is disclosed wherein each tier includes a belt conveyor of unique design having minimal depth requirements. These belt conveyors can be operated in combination with external conveyors to effect embarkation and debarkation, and present little impedance to ventilation when the apparatus is fully loaded.

11 Claims, 6 Drawing Figures

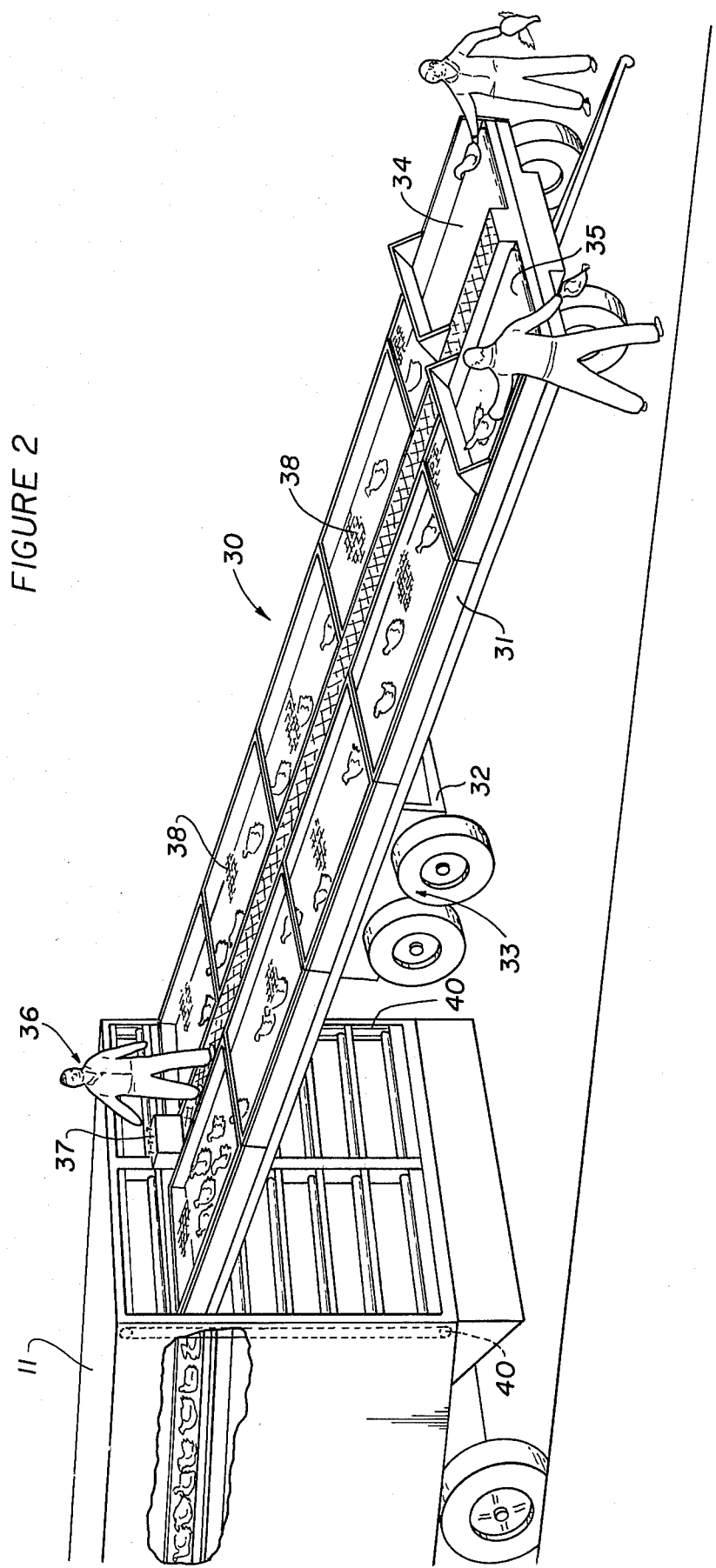

POULTRY CONVEYING SYSTEM

BACKGROUND OF THE INVENTION

FIELD OF THE INVENTION

This invention relates to apparatus for use in conjunction with poultry farming; more particularly, it relates to mobile apparatus suitable for loading and unloading live poultry and transporting it safely from place to place.

BACKGROUND OF THE INVENTION

At the present time poultry farming is carried out by raising poultry in houses dispersed over a relatively wide area and transporting the grown birds to a centrally located processing plant. Usually, the birds are gathered manually at the houses, crated in groups of 12 to 16 birds per crate, loaded aboard an open van, shipped to the poultry processing plant, manually unloaded from the crates and then processed.

It has been recognized that this system of poultry handling is expensive and inefficient. As a result of poor weather conditions and the physical bruising which necessarily accompanies manual handling and crating, there is a relatively high loss of birds and excessive down-grading. The inability of birds to care for themselves also results in suffocation within the crates because of poor ventilation.

U.S. Pat. No. 3,683,862 discloses mobile apparatus specially designed for the loading and conveyance of poultry within a ventilated environment. This apparatus includes a multi-tiered compartment ventilated with negative pressure created by blowers which may be thermostatically controlled. The birds are loaded into this apparatus under the effect of the vacuum created by these blowers. Each tier is provided with a folded liner for accepting individual birds at one end of the apparatus and transporting them to the remote end.

It is a principal desire of poultry handling to effect loading and unloading with a minimum of physical contact with or between the birds, yet efficiency dictates maximum density of loading and maximum use of the internal volume of conveying apparatus. As this prior patent demonstrates, proper ventilation and control over the environment within a closed van is an effective way of high density shipping while preventing suffocation and protecting the birds from undesirable variations in temperature. On the other hand, the internal equipment within the apparatus and the conveyance means within each tier take up considerable room and tend to block or limit the necessary air passages.

SUMMARY OF THE INVENTION

The present invention is embodied in a unique compartment containing a plurality of tiers of the general nature disclosed in the aforementioned patent. As distinguished from this prior apparatus, the present apparatus makes possible more efficient use of space within the closed compartment and also provides for more effective loading and unloading of poultry therefrom.

It is an object of the present invention to provide for the maximum utilization of an enclosed ventilated compartment for the transport of poultry.

It is another object of the present invention to provide a belt conveyor system having an extremely high ratio of length to depth.

It is another object of the present invention to provide a poultry conveying apparatus having integral means at one end thereof for functionally linking internal conveying elements with an external conveying unit.

It is yet another object of the present invention to provide a unique elevator and coupling assembly for coupling an external conveyor unit at selective heights to the various tiers of a poultry conveying apparatus.

In accordance with one aspect of the invention, there is provided a multi-tiered chamber having individual longitudinal belt conveyor means located within each tier. The belts include a planar portion spanning substantially one-half the total circumference thereof and a linking chain portion spanning the remainder of the circumference.

In accordance with another aspect of the invention, there is provided in conjunction with a multi-tiered compartment, vertical elevator mechanisms comprising continuous chain units disposed at each side of the compartment. Coupling means are disposed along said units for coupling to external conveyance means; said external conveyance means being used for the loading of poultry onto the various tiers selected.

In accordance with yet another aspect of the invention, there is provided a combined poultry storage chamber and a mobile trailer unit. Coupling means are provided between these two units and the trailer is provided with conveyance means such that one end of the conveyance means is elevated under the control of the coupling means into position with each of said tiers. The other end of the conveyance means is then advantageously positioned for the loading of poultry or other elements thereon.

The above and other objects of the present invention and the numerous features thereof, will be more clearly understood and appreciated from the following description of the preferred embodiments illustrated in the accompanying drawings.

BRIEF DESCRIPTION OF THE DRAWINGS

FIG. 2 is a perspective view of the rear portion of a vehicle of the type shown in FIG. 1 with a portion broken away to reveal partially loaded poultry, and further illustrating a coupled trailer conveyor adapted to selectively load and unload poultry selectively to each tier;

DETAILED DESCRIPTION OF A PREFERRED EMBODIMENT

Figure 1:
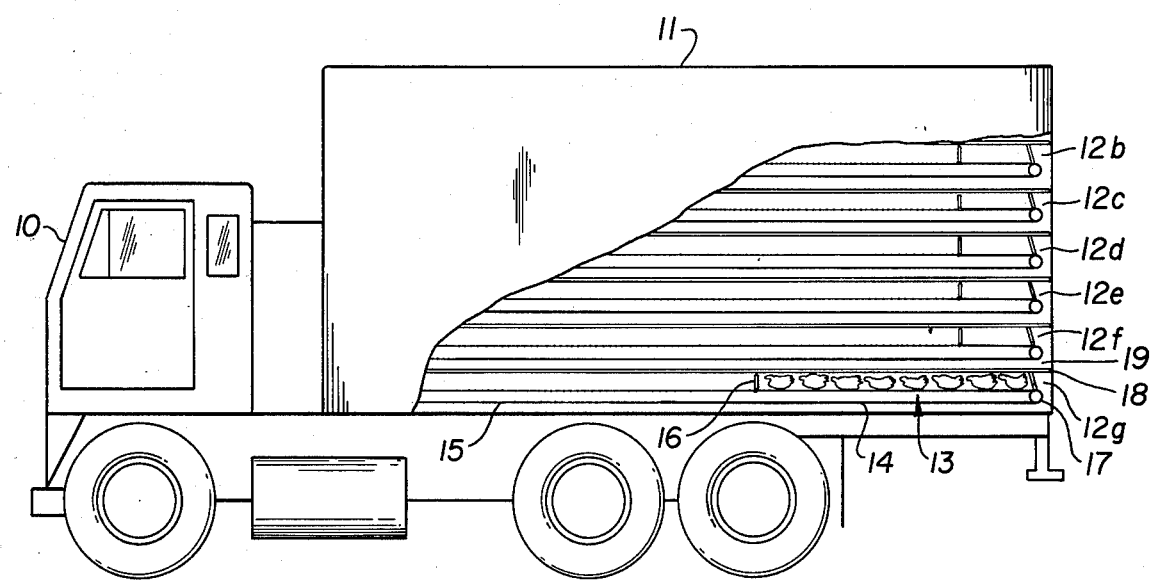
FIG. 1 is a side elevation view of a mobile vehicle carrying an enclosed poultry conveying compartment of the type contemplated herein, with one side wall illustratively broken away to reveal the internal tiers.
Figure 4:
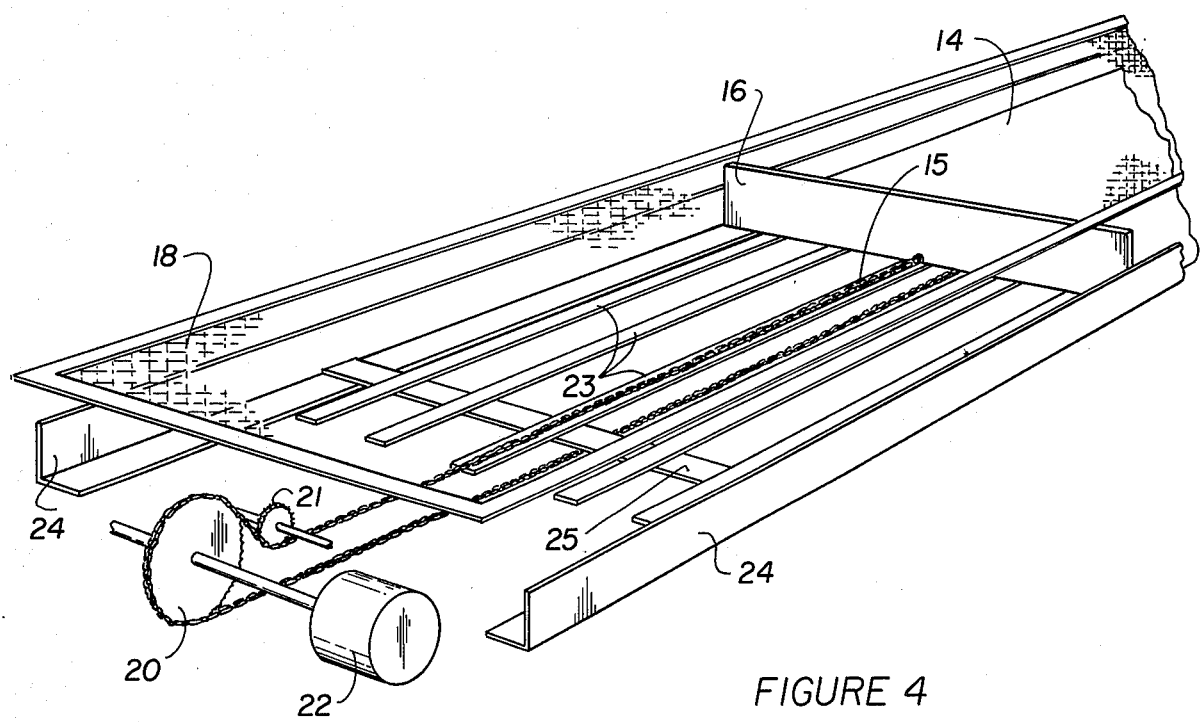
FIG. 4 is an enlarged perspective view of the conveyor system of the present invention which may be disposed within each tier of a compartment.

FIG. 1 illustrates a typical trunk 10 having the poultry conveying compartment 11 mounted and associated therewith. As shown by the cut-away portion, a plurality of tiers are disposed vertically within the chamber. Identical tiers may occupy each half of the compartment. The illustrated tiers 12b, 12c, 12d, 12e, 12f, and 12g, thus represent those appearing in the left half of the chamber; the uppermost tier, 12a, remaining concealed. Each tier contains its own poultry conveyor system. For purposes of description, reference may be had to the last tier, 12g, and FIG. 4.

The conveyor system employs a belt 13 having a planar portion 14, and an elongated flexible portion 15. The planar portion is of web or sheet material and preferably is impervious and cleanable. The flexible portion may advantageously be a linked chain, as this gives the required strength and can be conveniently driven and controlled by sprockets. Planar portion 14 makes up substantially one-half of the conveyor belt and the remainder is completed by chain portion 15. The belt is mounted on one end about a small diameter roller 17 (in a specific embodiment of the invention these rollers are approximately 2 inches in diameter and 4 feet long). The other end of the belt, at the remote end of compartment 11, is trained under an idler and around a drive sprocket 20. Drive sprocket 20 is controlled by a motor 22 which may be individual to the conveyor system in each tier. Electrical controls over motor 22 are led to the rear of compartment 11, and are directly operable by an operator at the rear opening. A gear reduction drive is employed in order to achieve the necessary power for driving the loaded conveyor and variable speed is used to control the density of birds on each belt. In the specific embodiment mentioned, a one-half horse power motor was adequate for driving a loaded conveyor approximately 30 feet in length.

The actual mounting of equipment within a tier is facilitated by means of angle elements 24 running lengthwise on each side of the conveyor belt 13. Additional support for portion 14 is provided by longitudinal strips 23, which may be supported by transverse strips 25. Chain 15 is trained over and under strips 23, 25 and they are kept widely spaced to create minimum impedance to the longitudinal flow of air.

Each conveyor unit includes a baffle or stop element 16 extending transverse the tier and projecting upward toward a permeable crowding screen 18. The purpose of the crowding screen is to keep the poultry from standing up or moving on the belt. Above crowding screen 18 there is an air passage 19 extending the entire length of compartment 11. The upper limits of this air passage are defined by the conveyor belt 23 of the upper adjacent tier. It will be seen that when the conveyor belts are fully extended for a loaded tier, the chain portion will be in proximity to the lower crowding screen and consequently the effective air passage is defined by the lower surface of the planar portion 14.

Although not illustrated, it will be appreciated that compartment 11 includes a front plenum portion containing the blowers and electrical equipment for controlling ventilation and conveyance within the compartment. A general illustration of this front plenum portion is present in above-cited U.S. Pat. No. 3,683,862.

In contrast with the described tier conveyor system, in the past, large drums were employed to support belt conveyors. Alternatively, the above-cited patent suggests the use of a liner that is folded at the rear of each tier and gradually unfolded during poultry loading. Such a liner has the disadvantages of requiring considerable depth for storage and the inability to retract it effectively with a minimum of effort.

Figure 6:
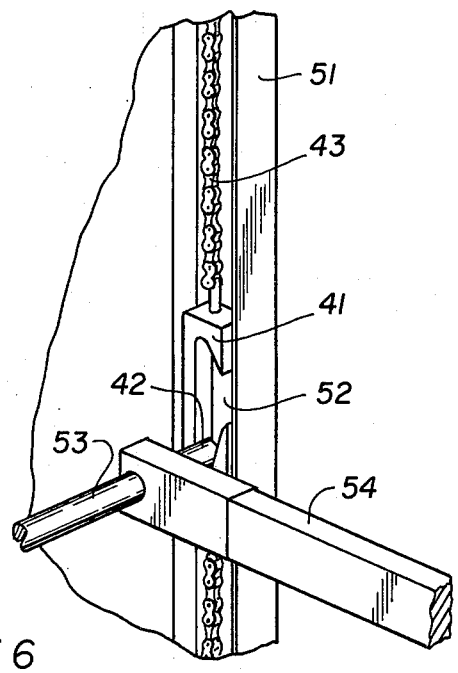
FIG. 6 is an enlarged perspective view of the coupling means carried by the elevator mechanism shown in FIG. 5.
Figure 5:
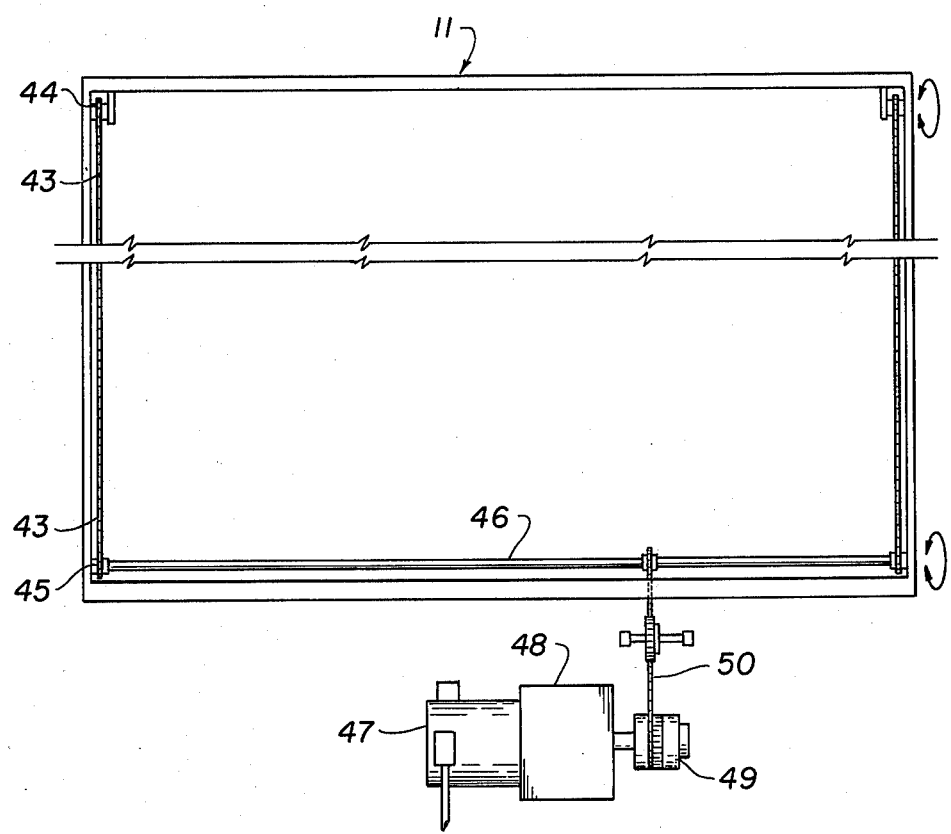
FIG. 5 is an illustrative view of pertinent portions of the rear of a compartment embodying the present invention and illustrating the elevator mechanism and control thereof.

FIG. 2 illustrates in perspective, the combined use of a compartment 11 and a trailer conveyor 30, in effecting either loading or unloading of the tiers. An elevator mechanism 40 is disposed along the vertical edges at the rear compartment 11. FIGS. 5 and 6 illustrate the components of this mechanism. Each elevator unit includes a coupling 41 adapted to receive a coupling element 42 on the front end of the trailer conveyor and position it with the particular tier being utilized.

Referring to FIG. 5, each elevator 40, comprises a chain or belt 43 mounted about an idler sprocket 44 at one end and a drive sprocket 45 at the other. The drive sprockets of each mechanism are mounted upon a common shaft 46, that may advantageously be located below the bed or at the bottom of the compartment 11. Drive shaft 46 is rotationally driven via suitable linkages by a motor 47. It has been found desirable to include within the linkages, a gear reducer 48, torque limiter 49, and a positive chain drive 50. All of the drive mechanism is located outside of the compartment 11, and preferably below the rear thereof. The electrical controls are brought to a common control position for use by the loading operator.

At least one segment of the chains 43 is located with an open channel 51, with the opening directed toward the center of the compartment. Coupling 41 rides within channel 51 and includes a mounting aperture 52 for accepting the coupling element 42 of the external conveyor. The width of coupling 41 may be greater than the depth of channel 51, to increase the ease with which coupling element 41 is engaged. As suggested in FIG. 6, elements 41 may be projecting ends of a traversing shaft 53.

The trailer conveyor 30 includes a conveyor chassis 31 mounted on axles 32 for hauling. A suitable drive mechanism 33 is provided for separate conveyor belts 34, 35 which traverse the longitudinal dimension of the unit. Coupling elements 53, 54, 42 are provided at the front end of the trailer conveyor to engage it with the elevators 40 of compartment 11. The loading operator 36 is provided with electrical controls 37 for the hoist drive motors and is thus enabled to position the trailer conveyor as desired. In operation, poultry handlers load the conveyors 34, 35 at the remote end and the birds are carried along the conveyor and deposited upon the tier conveyors in the compartment 11. If desired, deflecting hoods may be used near the loading end of conveyors 34, 35 and transverse horizontal screens 38 are used to keep the birds huddled calm, and relatively immobile on the belts.

During loading, the speed of the external conveyors 34, 35 is coordinated with the speed of the tier conveyors and as the birds are deposited upon the tier conveyor they are moved forward within compartment 11 at the appropriate speed to guarantee the desired density.

Figure 3:
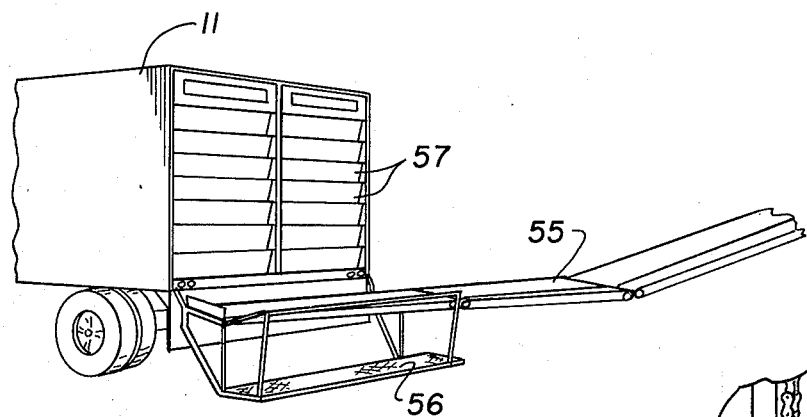
FIG. 3 is a perspective view of the rear portion of a vehicle of the type shown in FIG. 1, in combination with a different type of loading and unloading external conveyor unit operative to convey poultry from directions other than directly to the rear of the compartment.

FIG. 3 illustrates another input-output external conveyor 55, adapted to handle poultry from the sides of the compartment 11. With this arrangement also, the loading operator may be positioned right at the loading point upon a platform 56 and is provided with the electrical controls for elevator and conveyor motors. This figure also illustrates individual closing gates 57 for each tier.

All power for controlling the tier conveyors and the external loading conveyors, and the elevator hoist mechanism, is preferably controlled from the rear of compartment 11 by a single operator. Thus, the operator is able to position the external conveyor, control the speeds of the conveyor belts involved, and thus effect the density of loading. Advantageously, the operator is positioned directly at the rear of compartment 11 and continuously views the birds as they enter upon each tier conveyor. For convenience, the compartment 11 is divided into separate vertical tiers and the operator may load the tiers simultaneously or individually.

A particular embodiment of a conveying compartment containing the structural elements of this invention has been described in cooperation with several external conveyor units. Particular attention is directed to the trailer conveyor that has been shown and described in connection with FIG. 2. It has been found convenient to utilize such a trailer conveyor and actually move it around with the compartment to both the poultry houses and the processing plant. Where this is the case, it may be fully utilized for both loading and unloading. Experience shows that a minimum of bruising results from the use of this trailer conveyor and that the combination of the trailer conveyor with the conveying compartment results in a maximum of loading and unloading efficiency.

Modifications in the various elements will be apparent to those skilled in the art. All modifications coming within teaching of this disclosure and the scope of the appended claims, are intended to be covered thereby.

What is claimed is:

1. A poultry conveying system comprising an enclosed compartment having an opening at one end, a plurality of vertical tiers within said compartment, a belt conveyor disposed along the bottom of each tier, a small diameter roller between the upper and lower reaches at the end of each belt conveyor adjacent to said opening, said roller being mounted for rotation about an axis transverse the longitudinal axis of said belt conveyor, support and drive means coupled to said belt conveyor to effect movement along the path defined by said belt conveyor, at least one linked chain belt mounted about sprocket means and disposed vertically along said one end of said compartment, an external conveyor, a coupling element on said chain belt for coupling to said external conveyor, and a drive shaft coupled to said sprocket means, whereby said external conveyor is selectively positioned at horizontal levels corresponding to the location of each of said tiers.

2. A poultry conveying system according to claim 1, including means for controlling the respective operation of each of said belt conveyors and said external conveyor from a common location.

3. A poultry conveying system according to claim 1, including support means positioned within said belt conveyor.

4. A poultry conveying system according to claim 1, including a planar air permeable screen member disposed between tiers a predetermined distance above the lower adjacent belt conveyor.

5. A poultry conveying system as defined in claim 1, including an open channel extending vertically along said one end of said compartment, said linked chain belt having at least one vertical segment positioned within said channel, and a coupling element rigidly mounted on said external conveyor projecting into said open channel for engagement with the coupling element on the linked chain.

6. A poultry conveying system as defined in claim 1, having one of said linked chain belts vertically disposed at each side of said compartment, said drive shaft being coupled in common to the sprocket means of each linked chain belt and operative to drive them in unison, each of said linked chain belts having a coupling element at the same vertical height for coupling to said external conveyor.

7. A poultry conveying system according to claim 1, wherein said closed belt conveyor comprises an element having a longitudinally extending substantially unobstructed planar portion connected at each end to an elongated flexible member to form a closed loop.

8. A poultry conveying system according to claim 1, wherein the respective lengths of the planar portion and the elongated flexible member are substantially equal.

9. A poultry conveying system as defined in claim 7, including a single projection extending outwardly across the surface of said belt conveyor on the upper reach between said planar portion and said elongated flexible member.

10. A poultry conveying system as defined in claim 7, wherein said support and drive means is coupled to the elongated flexible member of said conveyor and includes positioning means for minimizing the separation between the upper and lower reaches of the conveyor at said other end of the compartment.

11. A poultry conveying system as defined in claim 7, wherein said elongated flexible member is a linked chain and said support and drive means includes a sprocket coupled in driving relation to said chain.

* * * * *

UNITED STATES PATENT OFFICE
CERTIFICATE OF CORRECTION

Patent No. 3,916,835          Dated November 4, 1975

Inventor(s) Frank N. Reynolds

It is certified that error appears in the above-identified patent and that said Letters Patent are hereby corrected as shown below:

Column 6, line 8  Change "within" to

--between the upper and lower reaches of--

Signed and Sealed this

*third* Day of *February 1976*

[SEAL]

*Attest:*

RUTH C. MASON
*Attesting Officer*

C. MARSHALL DANN
*Commissioner of Patents and Trademarks*